G. DE GREY.
SAFETY CONNECTION FOR GAS FIXTURES.
APPLICATION FILED OCT. 7, 1913.

1,236,151.

Patented Aug. 7, 1917.

Witnesses
George W. Kane
James P. McNulty

Inventor
Gerald de Grey
By Joshua Matlack
Attorney

UNITED STATES PATENT OFFICE.

GERALD DE GREY, OF PHILADELPHIA, PENNSYLVANIA.

SAFETY CONNECTION FOR GAS-FIXTURES.

1,236,151.  Specification of Letters Patent.  Patented Aug. 7, 1917.

Application filed October 7, 1913. Serial No. 793,850.

*To all whom it may concern:*

Be it known that I, GERALD DE GREY, a subject of the King of Great Britain, residing in the city and county of Philadelphia, State of Pennsylvania, have invented a certain new and useful Improvement in Safety Connections for Gas-Fixtures, of which the following is a specification.

My invention relates to safety connections for gas fixtures, the object of which is to provide a connection of this character which comprises two members, one adapted to telescope within the other and to be securely locked therein, and when so projected one within the other, the gas-controlling valve will be opened, and when the members are separated, either through accident or design, the valve will automatically close; another feature of the improvement being an auxiliary member which absolutely prevents disengagement of said two members except by manipulation whereby the safety quality is very greatly strengthened, this invention being designed as an improvement upon the safety connection patented by me February 20, 1912, and covered by Patent No. 1,017,654.

These objects are accomplished by means of the novel device presently described and shown in the accompanying drawings, in which, Figure 1 is a side elevation of my coupling partly cut away, and showing the casing and plug in connection with each other.

Figure 5:
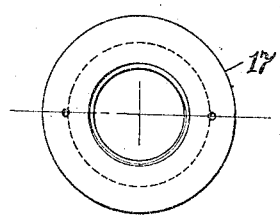

Fig. 5 a plan view of said collar.

Figure 6:
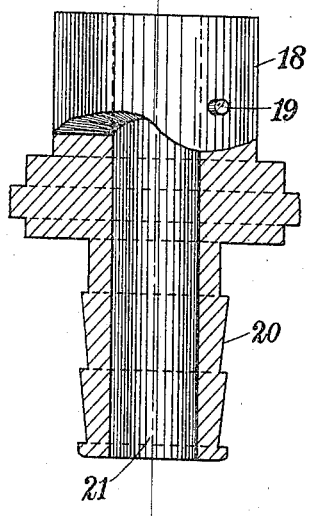

Fig. 6 is a side elevation of the plug partly cut away.

Figure 7:
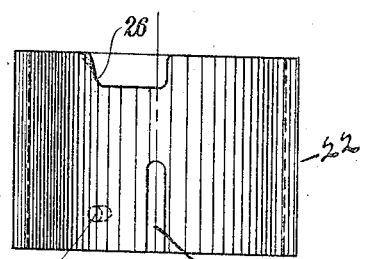

Fig. 7 is a side elevation of the interlocking collar; and

Figure 8:
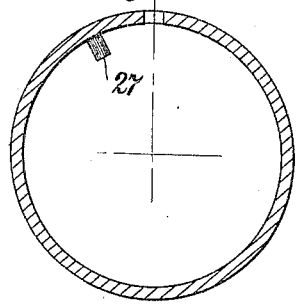

Fig. 8 a plan view of the same.

Figure 9:
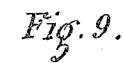

Fig. 9 is an elevation of the spring which operates upon the valve.

Similar numerals of reference designate corresponding parts throughout the several views.

Figure 1:
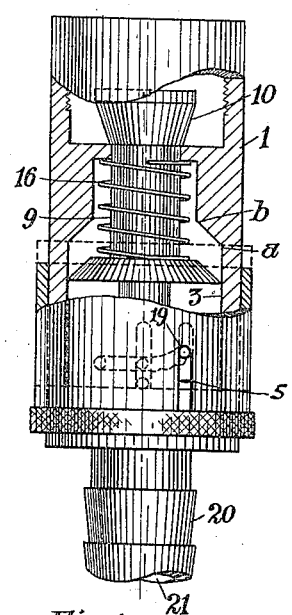
Figure 2:
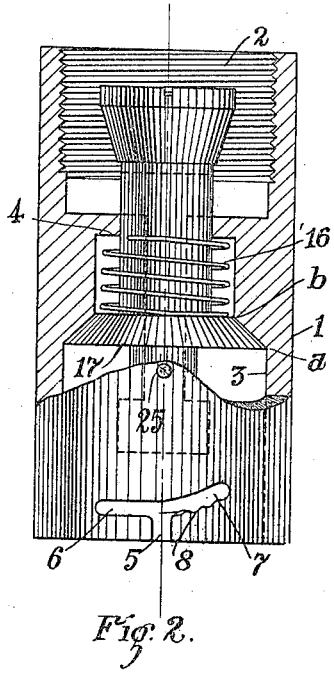
Fig. 2 is a side elevation of the casing partly cut away.

My invention consists of one member, a casing 1 (Fig. 1) provided at one end, on its inside, with threads 2, the inside surface 3 at its opposite end being smooth and straight to a point a, the walls then tapering for a short distance to b, then continuing another distance, at a reduced circumference or diameter to shoulder or rib 4. The wall of this casing at its lower edge is provided with a bayonet slot composed of perpendicular trunk 5, open at its bottom, and terminating at its top into branch 6 extending to the left and at right angles to said trunk, and diagonal branch 7 extending upwardly and to the right and provided on its lower edge with serrations 8 to receive the pin on the plug, as hereafter described, and hold such plug from movement when in engagement with the casing.

Figure 3:
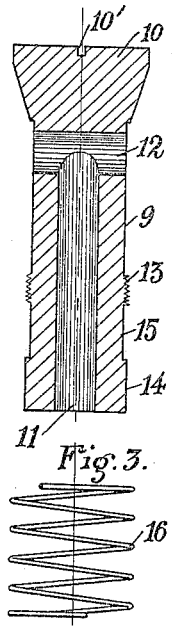
Fig. 3 is a sectional elevation of the valve which operates inside the casing.
Figure 4:
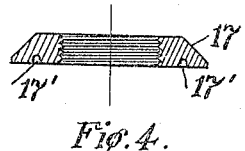
Fig. 4 is a side view of the metal collar cut through the center.

The next element of my invention is the valve 9 (Fig. 3), which consists of an elongated piece of metal provided with a conical head 10, the body of said valve having channel 11 which terminates at the top under the head, in the opening 12 extending from one side of the body to the other. Below this opening is threaded rib 13; at the lower end of which valve is enlarged part 14, between which and the rib 13 is cylindrical groove 15. 16 (Fig. 9), is a spiral spring, which, after the valve is inserted in the casing 1, is slipped over said valve from the open end of the casing, one end of said spring bearing against shoulder 4 of said casing, while the other or lower end bears against metal collar 17 (Figs. 4 and 5) which is then screwed on the rib 13 of the valve; the function of said spring being normally to retain the valve firmly anchored to its seat against the rib 4 of the casing, the head 10 resting upon the upper face of said rib, thus preventing the escape of gas when the plug (Fig. 6) has become disengaged from the casing, either by accident or design; rubber gaskets being slipped upon said valve and into the groove 15 to insure this result beyond all question.

I assemble the above parts by inserting the valve 9 in the top of the casing 1, the conical head 10 of the former resting upon the upper face of the rib 4 of the latter. The spring 16 is then slipped over the valve from the slotted or lower end of the casing, the metal ring 17 being applied to the threaded rib 13 of the valve by holding the valve from movement by means of a pin-wrench applied to holes 10' in the upper face of head 10 while the ring 17 is screwed to place by another pin-wrench applied to holes 17' in the face of said ring. The rubber gaskets are then slipped over the valve and sink to place in the groove 15.

The other member of my device is a plug 18 (Fig. 6) provided with a pin 19 and a corrugated stem 20 which is inserted into the core of the tubing and securely fastened in the usual manner; in the other end of which tubing is inserted a turning and secured therein in the same manner. The turning is screwed on the gas appliance which is furnished with male standard threads at the take-in point. A central channel 21 runs through the plug and its stem for the passage of gas.

The plug telescopes into the safety connection, the pin 19 entering slot 5 and advancing to the top thereof, when, by giving the plug a half turn to the right, said pin travels along the diagonal branch 7 and when it arrives at the end of said slot, sinks into a serration 8 and locks the plug in the casing. When the plug is forced into the casing it strikes the valve and drives it longitudinally against the action of the spring 16 so that the head 10 will leave its seat and expose the opening 12 back and above the shoulder 4, permitting the gas to flow freely through said opening and valve to the point of consumption. If the engagement of the casing and plug, either by accident or design, is broken, the spring 16 instantly forces the valve 9 to its seat on the shoulder 4 and the supply of gas is as quickly shut off and all danger averted.

For the purpose of reinforcing the locking of the casing and plug together, I provide an interlocking device which is shown in Fig. 7, the same consisting of a collar 22 adapted to fit over the casing 1 and provided with a perpendicular slot 23, open at its bottom, and having on its inside face and a suitable distance from the bottom of the collar and to the left of the slot, a pin 27. In applying the collar to the casing, its pin 27 enters the slot 5 and the collar being turned to the left, said pin traveling slot 6 which is of a sufficient length to allow slot 5 on the casing and slot 23 on the collar to register exactly with each other to permit of the insertion of the plug 18 in said casing, the pin of which plug, in traveling up the diagonal slot 7, carries the collar around with it, disengaging the pin 27 of the collar from slot 6, and when the pin 19 of the plug has become seated in the top serration 8 of the slot 7, the collar is pulled down which causes the pin 27 of the collar to enter the slot 5 of the casing and thereby hold said collar from lateral movement, or from any movement, until pushed up by manipulation; until this is done the casing and plug cannot possibly become disengaged.

By the above construction of the interlocking collar it will be observed that it is necessary to pull it down to seat it; but by providing the casing at a suitable point with a pin or cam 25 and providing the upper edge of the collar with a slot or depression 26, one side of which is inclined or convex, and the other wall perpendicular, the collar is automatically caused to descend as the pin of the plug advances to its place in the slot 7, the pin 25 working down the convex wall of the depression 26 forcing the collar downward into its interlocking position.

While the preferred form of my device is the casing and plug in combination with the collar with its depression 26, yet the device can be used without the collar at all without departing from the spirit of my invention.

To release the plug, it is necessary to push the collar up and turn said plug to the left, a feature that is intended as a precautionary measure.

This safety connection can be used with all portable gas appliances, the connection being provided with female standard threads 2 on one end to screw said connection on to the gas-supply cock or goose-neck. And, if necessary, two safety connections can be used, one on the supply and one on the end of the tubing in place of the turning, the gas appliance to be provided with a plug instead of male threads at the take-in.

Having now described my invention, what I claim as new and desire to secure by Letters Patent, is:—

1. A connection of the character described consisting of two members adapted to telescope one within the other, one member being a casing provided with a slot 5 having branches 6 and 7, and the other member being a plug provided with a pin adapted, when said plug is inserted in the casing, to operate in said slot and branches, and means coöperating with the said branches for locking the members in assembled relation.

2. A safety connection for gas fixture consisting of a casing provided with a slot having a right-angle branch and a diagonal branch; a collar on said casing provided with a perpendicular slot and a pin; and a plug provided with a pin adapted, when the plug is telescoped within the casing, to enter the slots on the casing and the collar and travel the diagonal slot on said casing carrying the collar with it, and the pin on the collar entering the perpendicular slot on the casing and preventing said collar from lateral movement.

3. A safety connection for gas fixture consisting of a casing and a plug the latter adapted to telescope within the former; means for locking both in telescoped position; a valve in said casing provided with a spring to normally hold said valve seated, which valve is adapted to be unseated by the plug when in connection with the casing; and a collar on said casing provided with a perpendicular slot and a pin, said collar being adapted to be carried around by the pin on the plug as it advances to its seat, the pin on the collar engaging the perpendicular slot in the casing and prevent the lateral movement of said collar, substantially as shown and described.

4. A safety connection for gas fixture consisting of a casing and a plug, the latter adapted to telescope within the former; means for locking both in telescoped position; a valve in said casing provided with a spring normally to hold said valve seated and which valve is adapted to be unseated by the plug when in connection with the casing; and an interlocking collar moving on said casing provided with a perpendicular slot, a pin and a depression, said collar being adapted to be carried around by the pin on the plug as it advances to its seat and caused, at the same time, to descend automatically to its interlocking position by its depression operating against a pin on the casing, the pin on the collar engaging the perpendicular slot on said casing and preventing the collar from lateral movement, substantially as shown and described.

5. A safety connection for gas fixture, consisting of a casing and a plug, the latter adapted to telescope within the former; means for locking both in telescope position, and an interlocking collar moving on the casing provided with a perpendicular slot, a pin and a depression, said collar being adapted to be carried around by the pin on the plug as it advances to its seat and at the same time automatically caused to descend to its interlocking position by its depression operating against a pin on the casing, the pin on the collar engaging the perpendicular slot on said casing and preventing lateral movement of the collar, substantially as shown and described.

GERALD DE GREY.

Witnesses:
MARY F. LYONS,
ELIZABETH G. BANES.

Copies of this patent may be obtained for five cents each, by addressing the "Commissioner of Patents, Washington, D. C."